United States Patent [19]
Agostinelli et al.

[11] Patent Number: 5,295,218
[45] Date of Patent: Mar. 15, 1994

[54] FREQUENCY CONVERSION IN INORGANIC THIN FILM WAVEGUIDES BY QUASI-PHASE-MATCHING

[75] Inventors: John A. Agostinelli, Rochester; Mool C. Gupta; Jose M. Mir, both of Webster, all of N.Y.

[73] Assignee: Eastman Kodak Company, Rochester, N.Y.

[21] Appl. No.: 953,926

[22] Filed: Sep. 29, 1992

[51] Int. Cl.$^5$ .......................... G02B 6/10; G02F 2/02
[52] U.S. Cl. ................................. 385/122; 385/130; 385/142; 359/326; 359/332
[58] Field of Search ............... 385/122, 129, 130, 132, 385/142; 359/326, 328, 332

[56] References Cited

U.S. PATENT DOCUMENTS

| | | | |
|---|---|---|---|
| 3,982,136 | 9/1976 | Bergman, Jr. et al. | 359/328 |
| 4,016,427 | 4/1977 | Szilagyi et al. | 359/328 |
| 5,036,220 | 7/1991 | Byer et al. | 385/122 |
| 5,052,770 | 10/1991 | Papuchon | 359/328 |
| 5,171,400 | 12/1992 | Magel et al. | 156/620.72 |

OTHER PUBLICATIONS

Lim et al., *Electronics Letters*, vol. 25, No. 11, 25 May 1989, "Doubling in Periodically Poled Lithium Niobate Channel Waveguide", pp. 731–732.
Mizuuchi et al., *Appl. Phys. Lett.*, 58(24), 17 Jun. 1991, "Second-Harmonic Generation of Blue Light in a LiTaO$_3$ Waveguide", pp. 2732–2734.
Suhara et al., *Electronics Letters*, vol. 25, No. 20, 28 Sep. 1989, "Measurement of Reduction in SHG Coefficient of LiNbO$_3$ by Proton Exchanging", pp. 1326–1328.
Matsumoto et al., *Integrated Photonics Research, Topical Meeting*, Apr. 9–11, 1991, Monterey, Calif., "Second-Harmonic Generation of Blue Light in a Periodically Poled LiTaO$_3$ Waveguide", p. 97.
Somekh et al., *Optics Communication*, vol. 6, No. 3, Nov. 1972, "Phase Matching by Periodic Modulations of the Nonlinear Optical Properties", pp. 301–303.

*Primary Examiner*—Frank Gonzalez
*Attorney, Agent, or Firm*—Raymond L. Owens

[57] ABSTRACT

A frequency converter/mixer has a crystalline substrate which supports an inorganic, crystalline, nonlinear optical thin film having a higher index of refraction than the substrate, to form an optical waveguide. Input radiation of frequency $\omega_1$ which enters the waveguide propagates through the waveguide and exits as radiation having a different frequency $\omega_2$. The frequency conversion of the input radiation is accomplished by first-order quasi-phase-matching the input and output signals as a result of the periodicity of the sign-alternating nonlinear dielectric susceptibility coefficient of the optical thin film over an active region of the waveguide. A method of first-order quasi-phase-matching is also disclosed.

22 Claims, 1 Drawing Sheet

FREQUENCY CONVERSION IN INORGANIC THIN FILM WAVEGUIDES BY QUASI-PHASE-MATCHING

BACKGROUND OF THE INVENTION

1. Field of the Invention

This invention relates generally to methods and devices for optical frequency conversion and more particularly to a method for first-order optical frequency conversion by quasi-phase-matching (QPM), and an inorganic, thin film waveguide device for generating first-order, quasi-phase-matched, frequency converted light.

2. Description of the Related Art

It is particularly useful to be able to generate shorter wavelength optical radiation from a longer wavelength optical source by changing the frequency of the source radiation. Frequency mixing or frequency doubling, also referred to as second harmonic generation (SHG), have generally been the techniques used to accomplish this. Devices which are capable of frequency conversion and which are made from bulk inorganic nonlinear optical materials are well known in the art.

A consistent obstacle in the continued advancement of frequency conversion devices is more efficient conversion of fundamental input optical radiation to frequency converted output light. In general, high efficiency frequency conversion requires consideration of the following: the desirability of optical materials which are strongly nonlinear, i.e., having relatively high second-order nonlinear optical coefficients; availability of high source intensities at the input frequency because the nonlinear coefficients for currently available nonlinear materials are small; the ability to phase-match the fundamental and second harmonic waves in a waveguide; i.e., equalize and match their phase velocities thus allowing energy to be continuously transferred from the fundamental source or input wave to the second harmonic output wave. Other desirable conditions include low optical absorption and scattering by the waveguide materials at both the input and converted frequencies; good mechanical properties of the substrate; environmental stability; and, compatibility with standard optical fabrication technology.

At the time of this invention, more efficient second harmonic generation in nonlinear optical waveguides formed in bulk single crystals had been demonstrated using third-order quasi-phase-matching. This approach offered several advantages over the more conventional nonwaveguide methods of frequency conversion using birefringence to achieve phase matching. The ability of a waveguide to confine light over long propagation distances allows for high intensity input light to propagate over a considerable interaction length; that length comprising the active region of the propagation medium in which quasi-phase-matching occurs, contributing to the high overall efficiency of quasi-phase-matched frequency conversion. High quality nonlinear single crystals, however, are expensive. Furthermore, bulk single crystal substrates typically serve only the limited function of a substrate, thereby lacking alternate utility that semiconductor devices, for example, might provide. Another disadvantage of using bulk single crystal materials is the lower limit waveguide thickness achievable with waveguides formed as modified surface structures in bulk materials. The consequence of thick waveguides includes larger waveguide cross-sectional areas and thus lower waveguide mode field intensities which result in lower conversion efficiency. Degradation of the nonlinear optical coefficient has also been reported during the process of waveguide formation in bulk single crystals. These material limitations, however, must be considered in conjunction with the advantages of using quasi-phase-matching to achieve optical frequency conversion.

Quasi-phase-matching provides a flexible approach to the phase matching problem in that there is no need to compensate for material dispersion; that is, the variation in the index of refraction in the material as a function of wavelength, as with birefringence phase-matching. QPM also eliminates the need to rely on waveguide dispersion for frequency conversion, which requires stringent waveguide tolerancing. Quasi-phase-matching allows the free choice of crystalline orientation and propagation direction for a given nonlinear material so that the highest nonlinear optical coefficient of the material can be utilized. Furthermore, quasi-phase-matching can be achieved for any arbitrary wavelength.

Quasi-phase-matching frequency conversion efficiency is closely related to the order number of the QPM structure. QPM is accomplished when the direction of the polar axis of the ferroelectric, nonlinear crystalline material is periodically reversed by 180 degrees along the propagation direction of the input optical radiation. The sign of the nonlinear optical coefficient, effectively, the sign of the second order dielectric susceptibility component, likewise alternates as the crystal polar axis periodically reverses in direction. This allows the transfer of energy from the fundamental frequency to the converted frequency in a monotonically increasing way provided that the half-period of the alternating, nonlinear dielectric susceptibility component is an odd integral multiple of the coherence length. The coherence length is the propagation distance in the nonlinear medium over which a phase difference of $\pi$ is established between input frequency waves and frequency converted waves in the waveguide. Typical materials exhibit a coherence length of a few microns. The odd integer multiple of the coherence length, which characterizes the periodicity of the active region of the QPM structure, that is, the grating period of the sign-alternating nonlinear optical coefficient, is referred to as the order number, m, of the QPM structure. In the nondepletion limit, the efficiency of quasi-phase-matched frequency conversion varies as the inverse of the square of the order number; i.e., $1/m^2$.

First-order ($m=1$) QPM thus results in the most efficient frequency conversion. To date, the majority of work involving quasi-phase-matching in nonlinear, inorganic waveguides has dealt with waveguide formation in bulk, nonlinear, single crystals. Up to the time of the instant invention, the most efficient frequency conversion by quasi-phase-matching using surface modified, bulk single crystal waveguides has been limited to third-order OPM.

Lim et al. reported the generation of blue light at 410 nm by continuous-wave frequency-doubling in a periodically poled lithium niobate channel waveguide, using the $d_{33}$ nonlinear coefficient, in Electronics Letters, Vol. 25, No. 11 (1989). More recently, in Appl. Phys. Lett. Vol 58, No. 24 (Jun. 1991), Mizuuchi et al. reported a third-order QPM-SHG device in $LiTaO_3$ with a low-loss proton-exchanged waveguide.

Alternatively, Somekh and Yariv theoretically proposed periodically modulating the optical nonlinear coefficient of a thin film, dielectric, single crystal waveguide to achieve apparent first-order phase-matched optical frequency conversion as far back as 1972. They speculated that practical implementation of their work could be achieved in a thin film waveguide by sputter-filling ion-milled grooves in the waveguide with a polycrystalline form of the film material, thus rendering the nonlinear optical coefficient null in the filled areas. The overall value of the nonlinear optical coefficient in the propagation medium, however, would effectively be reduced because no energy conversion to the second harmonic wave would occur over every half-period of the periodically poled waveguide; that is, in the filled regions. Although they apparently devised a first-order quasi-phase-matched optical frequency conversion scheme, the anticipated efficiency of the speculative structure was still a factor of four less than true first-order quasi-phase-matched frequency conversion. The actual efficiency of their method, had such a device ever been built, is unknown.

In summary, existing optical frequency converters using quasi-phase-matching are materially and technically limited, while formerly proposed first-order quasi-phase-matched frequency conversion means failed, in principle, to achieve the potential of true first-order quasi-phase-matching.

SUMMARY OF THE INVENTION

An object of the present invention is to disclose a method and a device for producing first-order quasi-phase-matched optical frequency conversion, including second harmonic generation and frequency mixing. An important advantage of the present invention is the improvement in the efficiency of quasi-phase-matched optical frequency conversion achieved over the prior art. Another primary advantage of the present invention is the use of an inorganic thin film waveguide having a first-order quasi-phase-matching structure to achieve the herein described efficient optical frequency conversion.

The present invention offers cost savings over bulk single crystal waveguides because the thin film approach allows the use of less costly substrate materials. Furthermore, sufficiently thick nonlinear thin films may be deposited on a substrate having a lower refractive index to automatically form a waveguide, without the need to use conventional means to form waveguides in bulk single crystal materials. In addition, the thin film waveguide approach offers the potential to choose substrate materials which offer increased capabilities; for example, semiconductor substrates.

A further advantage of the present invention is the elimination of the degradation of the nonlinear coefficient during the process of waveguide formation, which has been reported with bulk single crystals devices. This advantage results from the index difference between the thin film and the substrate and the resulting natural waveguide characteristics of the medium.

A still further important advantage of this invention is first-order quasi-phase-matched frequency conversion. This is a direct consequence of the fact that thin film waveguides may be much thinner than their surface modified bulk single crystal counter-parts. A thin waveguide cross-section also reduces the difficulty of periodically poling the nonlinear coefficient by chemical means, as such means involve an amount of diffusion control which is dependent on the waveguide thickness. In the past, surface modified waveguides, such as $LiNbO_3$ or $LiTaO_3$, have been limited to third or higher-order quasi-phase-matching because of waveguide thickness. Surface modified waveguides exhibit thicknesses of the same magnitude as a first-order QPM grating period. In a thin film waveguide, for example, $LiNbO_3$ or $LiTaO_3$ on (0001)-sapphire, the waveguide thickness may be significantly less than the first-order quasi-phase-matched grating period, facilitating the formation of the first-order QPM structure by conventional chemical means. The single mode cut-off condition for the particular combination of thin film/substrate materials now controls the lower limit on waveguide thickness. In the case of periodic poling of $LiNbO_3$ and $LiTaO_3$ bulk single crystal surface modified waveguide structures by chemical means, experimental evidence also indicates that the domain walls between oppositely poled segments are not perpendicular to the surface. The domain reversed regions have either triangular or semicircular geometry with the triangle or semicircle base residing on the surface of the material. Depths of the domain reversed regions are on the order of the waveguide depth. Thus, the duty cycle of periodic poling is a strong function of depth within the waveguide. The changing duty-cycle, as a function of depth, contributes to the reduced efficiency of bulk crystal frequency converters.

Prior to the instant invention, electrical means were also recognized to achieve periodic poling of the nonlinear optical coefficient. Difficulties with fringing fields existed, however, as the ratio of poling period to waveguide thickness decreased. This difficulty is overcome by the characteristic features of the present invention.

The present invention provides a highly efficient method for converting fundamental frequency input optical waves to output waves with a different, more usable frequency. The invention also describes a device which employs the aforesaid method in an inorganic optical thin film propagation medium supported by a crystalline substrate.

The present invention is especially advantageous because the device can be easily fabricated using available materials and well known fabrication techniques while overcoming the disadvantages that these known techniques created in the prior art devices.

DETAILED DESCRIPTION

Figure 1:
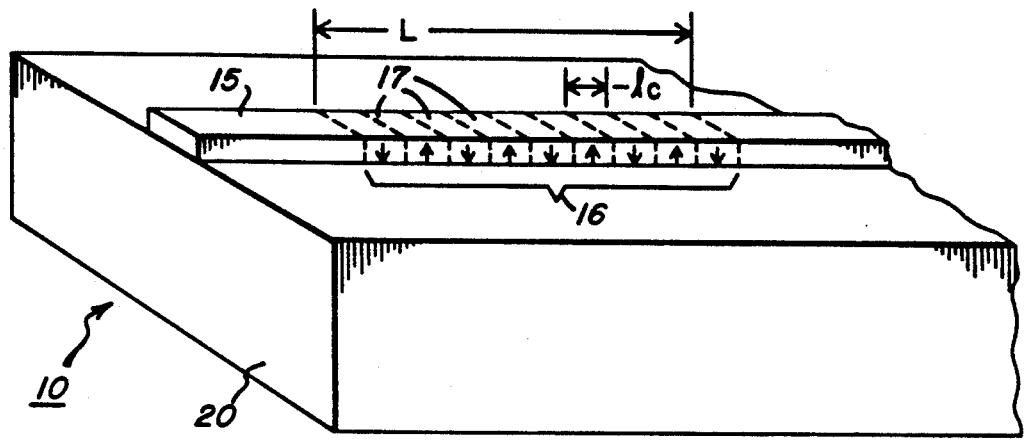
FIG. 1 schematically illustrates a substrate supported thin film channel waveguide having a first-order periodically poled active region with a sign-reversing nonlinear optical coefficient.

FIG. 1 schematically illustrates a preferred embodiment of the present invention. An optical propagation medium 10 includes an optical thin film channel waveguide 15 supported by a substrate 20. The waveguide 15 functions as a quasi-phase-matching frequency converter because the thin film material is a suitably selected nonlinear optical crystal having an active region 16 of characteristic length, L, effectively having a periodically sign-alternating, second-order dielectric susceptibility component 17 due to the periodic directional reversal of the ferroelectric nonlinear crystal polar axis achieved by means well known in the art. The half-period of the alternating nonlinear coefficient is an odd integral multiple (m=1,3,5,...) of the coherence length; that is, the propagation distance over which a phase relationship of $\pi$ is established between the input and frequency converted waves. This grating period establishes mth order quasi-phase-matching in a nonlinear waveguide frequency converter. In the preferred embodiment, the half period of the periodically alternating nonlinear optical coefficient is made to equal a single odd integral multiple (m=1) of the coherence length, resulting in first-Order QPM.

A large variety of nonlinear optical thin film and substrate materials can be used in the present invention. The thin film and substrate materials must be compatible; that is, they must be matched in several respects. First, because the frequency conversion process requires crystalline order over the entire active region, or interaction length, L, for high efficiency conversion, the substrate must be capable of supporting, at least, one-dimensionally oriented thin film crystal growth. Preferably, the substrate will support 3-dimensionally oriented crystal growth. Second, chemical interaction at the film/substrate interface should be minimal and non-reactivity must be maintained during all processing steps which lead to the finished article. This inert relationship is especially critical during the thin film growth procedure and during the ferroelectric poling of the thin film due to the high temperature requirements of these processes. Third, stress in the thin film which may arise from differential thermal expansion of the film and substrate must be minimized; otherwise, the stress may lead to catastrophic failure through cracking or adhesion failure in the thin film. In some nonlinear optical materials, particularly those with low ferroelectric Curie temperatures, excessive stress can induce uncontrolled reversal of the polar axis direction in different regions of the film.

An important consideration in the choice of nonlinear optical thin film materials relates to their usable nonlinear coefficients. While it is true that OPM allows flexibility in the choice of the particular SHG nonlinear tensorial coefficient which may be used, it must be considered whether the thin film can be grown in the proper crystalline orientation to utilize a particular nonlinear coefficient. In a preferred embodiment, the film is grown in an orientation allowing the use of the largest nonlinear coefficient for a given material.

A further factor influencing the choice of the nonlinear film material is its susceptibility to optical damage, otherwise known as photorefractivity, which can severely degrade waveguide performance. In materials having very low Curie temperatures, that is, just above the operating temperature, the ferroelectric domain configuration of the whole nonlinear medium may be unstable. On the other hand, excessively high Curie temperatures will require high processing temperatures for poling and periodic domain reversal in the nonlinear material. This will lead to chemical interaction problems at the film/substrate interface. Thus it is preferred to select nonlinear optical thin film materials having Curie temperatures sufficiently above ambient to provide stability for the ferroelectric domains and, also, sufficiently low to allow for poling and domain reversal without damage. Curie temperatures in the range from 150° C. to 1200° C. are useful, while temperatures in the range from 200° C. to 800° C. are preferred. Optimal Curie temperatures range from 250° C. to 600° C.

Finally, the thin film refractive index must be greater than the substrate index of refraction for natural waveguide formation.

Particularly preferred optical thin film materials for the purpose of the present invention include $LiTaO_3$, $LiNbO_3$, $LiNb_xTa_{1-x}O_3(0<x<1)$, $KNbO_3$, $KNb_xTa_{1-x}O_3 (0<x\leq 0.7)$, $BaTiO_3$, $LiIO_3$, $ZnO$, $B-BaB_2O_4$, $Ba_2NaNb_5O_{15}$, $KTiOPO_4$, $KTiOAsO_4$ and PLZT compositions having permanent ferroelectric polarization.

It is preferable to interpose at least one non-absorbing, non-scattering (i.e. transparent) buffer layer between the thin film and the substrate when the substrate is itself absorbing; when the index of refraction of the substrate is greater than the index of the thin film; or, to maintain modal control within the propagation medium; otherwise, a waveguide may not exist, or the substrate may absorb energy existing as evanescent tails of both the input and second harmonic propagating waveguide modes. Absorption by the substrate will lead to reduced SHG output.

Preferable substrate materials should be inexpensive, exhibit high thermal conductivity and high thermal shock resistance, be non-absorbing and non-scattering, and, have a characteristic index of refraction lower than that of the thin film material, in addition to the previously mentioned properties. Preferred substrate materials include sapphire (monocrystalline $Al_2O_3$), monocrystalline $MgO$, $BaF_2$, $SrF_2$, $CaF_2$, $MgF_2$, $LiF$, $Y:ZrO_2$, $Ca:ZrO_2$, $LiTaO_3$, $SrTiO_3$, $LaAlO_3$, $LaGaO_3$, $NdGaO_3$, quartz, and $MgAl_2O_4$.

Thin films may be grown on suitable substrates by any techniques which are capable of producing high quality film growth. Such techniques include laser ablation, sputtering, evaporation, chemical vapor deposition, or others well known in the art. C-axis oriented films of $LiNbO_3$ and $LiTaO_3$, for example, can be achieved on (0001)-sapphire (surface perpendicular to sapphire c-axis direction) and (111)-MgO substrates. The c-perpendicular orientation of the nonlinear optical thin film makes possible the use of the large $d_{33}$ nonlinear coefficient for quasi-phase-matching frequency conversion; but also requires that the input light be polarized in a direction parallel to the c-axis direction of the film. This corresponds to a transverse magnetic (TM) polarization in the waveguide. Film thickness is preferably such that the waveguide supports only the lowest order TM mode.

Particularly preferred thin film/substrate combinations include $LiTaO_3$/sapphire, $LiNbO_3$/sapphire, $LiTaO_3$/MgO, $LiNbO_3$/MgO, and $LiNbO_3$/$LiTaO_3$.

In a preferred embodiment of the present invention, a three-dimensionally lattice oriented $LiTaO_3$ film/sapphire substrate combination comprises the thin film waveguide. The film is thereafter poled electrically by means well known to those skilled in the art.

Figure 2:
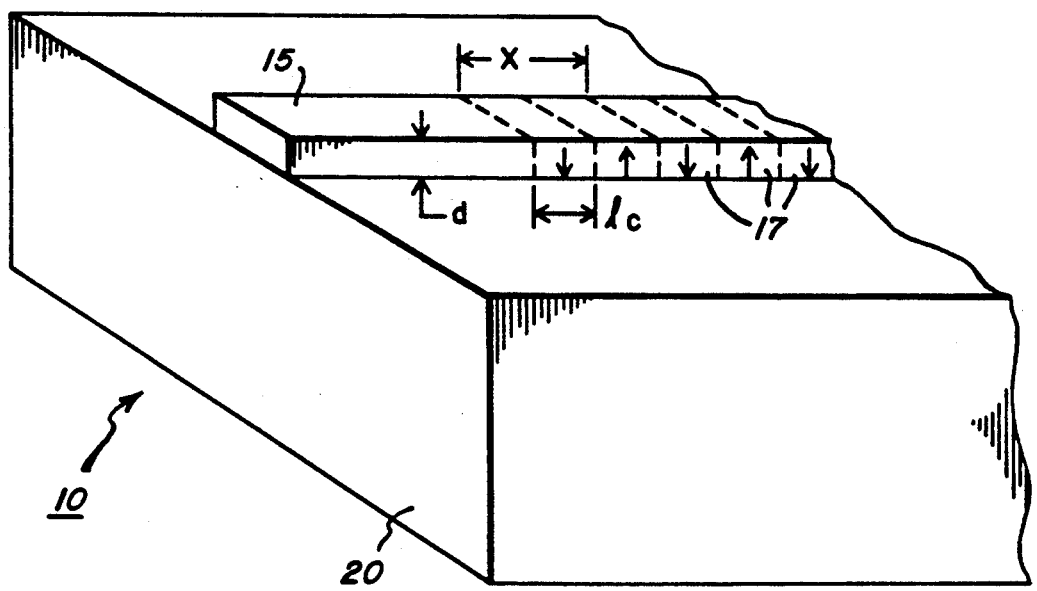
FIG. 2 is a more detailed view of FIG. 1 and indicates the relative dimensional relationship between the thin film thickness and the active region grating period.

With reference to FIG. 2, due to the fact that the cross-sectional thickness, d, of the thin film 15, is much less than a first-order QPM grating period, X, and considerably less than the waveguide thickness in surface modified crystals, conventional chemical or electrical poling techniques produce, effectively, a directionally alternating, nonlinear, dielectric susceptibility component 17. In the preferred embodiment the grating half-period, X, is equal to a single odd integral multiple of the coherence length resulting in a first-order quasiphase-matching thin film waveguide frequency converter.

Finally, in order to maintain the highest intrawaveguide light intensity, it is preferred that the waveguide be fabricated into a channel rather than a planar waveguide. This may easily be accomplished by photolithographic patterning and etching or doping (e.g. proton exchange) of the nonlinear film using techniques well known to those skilled in the art.

Alternatively, a patterned overlayer may provide an effective index difference sufficient to confine the optical radiation along the path, within the nonlinear medium, which is defined by the patterned overlayer.

The invention has been described in detail regarding certain preferred embodiments. It should be appreciated that variations may be effected within the scope of the invention, as defined by the claims to follow.

What is claimed is:

1. A device for producing an output signal having frequency $f_{out}$ from at least one input signal having a frequency $f_{in\ n}$, wherein $f_{in\ n}$ is different from $f_{out}$, comprising: a crystalline substrate having an index of refraction, $n_s$; and a noncentrosymmetric optically nonlinear inorganic thin film having an index of refraction $n_f$, wherein $n_f$ is greater than $n_s$, comprising an active region of characteristic length, L, attached to the substrate at an interface and crystallographically aligned in at least one dimension with the substrate for quasiphasematched frequency converting the input and output signals.

2. The device of claim 1 wherein the optical thin film is epitaxially attached to the substrate.

3. The device of claim 1 wherein the substrate comprises a non-absorbing, non-scattering monocrystalline material.

4. The device of claim 1 wherein the thin film comprises a ferroelectric crystalline material.

5. The device of claim 1 wherein the active region includes a plurality of contiguous domains having a firstorder periodicity, each domain having a polarization direction opposite to the polarization direction of the immediately adjacent domains.

6. The device of claim 4 wherein the thin film material comprises a material selected from a group of materials consisting of $LiTaO_3$, $LiNbO_3$, $LiNb_xTa_{1-x}O_3$ ($9 < x < 1$), $KNbO_3$, $KNb_xTa_{1-x}O_3$ ($0 < x \leq 0.7$), $\beta\text{-}BaB_{24}$, $Ba_2NaNb_5O_{15}$, $KTiOPO_4$, $KTiOAsO_4$, $BaTiO_3$, $LiIO_3$, NzO, and PLZT compositions having permanent ferroelectric polarizations.

7. The device of claim 3 wherein the crystalline substrate comprises a material selected from a group of materials consisting of sapphire (monocrystalline $Al_2O_3$), monocrystalline MgO, LiF, $Y:ZrO_2$, $Ca:ZrO_2$, $LiTaO_3$, $SrTiO_3$, $LaAlO_3$, $LaGaO_3$, $NdGaO_3$, quartz and $MgAl_2O_4$.

8. The device of claim 1 comprising a thin film/substrate combination selected from a group of combinations consisting of $LiTaO_3$/sapphire, $LiNbO_3$/sapphire, $LiTaO_3$/MgO, $LiNbO_3$/MgO and $LiNbO_3$/$LiTaO_3$.

9. The device of claim 1 wherein the thin film waveguide comprises a channel waveguide.

10. The device of claim 1 in which the substrate has at least one substantially planar surface and further in which the thin film is crystasllographically supported on the at least one planar surface.

11. The device of claim 1 in which the thin film is characterized by a plurality of nonlinear second harmonic generation coefficients, at least some of which are unequal in value, and in which the thin film is oriented on the substrate in a direction sufficient to utilize the nonlinear second harmonic generation coefficient having the largest absolute value.

12. The device of claim 1 comprising a channel waveguide.

13. The device of claim 5 in which the contiguous domains each have at least one interfacing domain wall, the thin film being sufficiently thin such that the domain walls are substantially perpendicular to the at least one planar surface of the substrate.

14. The device of claim 1 in which the interface comprises a step-wise change in index of refraction.

15. The device of claim 14 in which the stepwise change in index of refraction is between about 0.02 and 1.00.

16. The device of claim 14 in which the stepwise change in index refraction is preferably between about 0.1 to 0.7.

17. The device of claim 1 comprising a first-order frequency converter/mixer.

18. A method for making an optical device for converting an input signal having a fundamental frequency $f_1$ into an output signal having a converted frequency $f_2$, comprising the steps of:
   providing a crystalline substrate having at least one substantially planar surface and an index of refraction $n_s$;
   b) depositing a heterogeneous inorganic crystalline thin film having an index of refraction $n_f$ on the at least one planar surface, in which $n_f$ is greater than $n_s$, to form an epitaxial thin film waveguide;
   c) polling the thin film to create an active region comprising a plurality of contiguous domains having a first-order periodicity, each domain having a polarization direction opposite to the polarization direction of immediately adjacent domains.

19. The method of claim 18 in which the plurality of contiguous domains each have at least one interfacing domain wall, wherein the step of depositing a heterogeneous inorganic crystalline thin film on the at least one planar surface further comprises the step of depositing a film of sufficient thinness such that the domain walls are substantially perpendicular to the at least one planar surface.

20. The method of claim 18 in which the step of polling the thin film to create an active region comprises the step of chemically polling the thin film.

21. The method of claim 18 in which the step of polling the thin film to create an active region comprises the step of electrically polling the thin film.

22. The method of claim 18 in which the step of depositing a heterogeneous inorganic crystalline thin film on the at least one planar surface further comprises the step of forming a channel waveguide.

* * * * *